US009155054B2

(12) United States Patent
Kim et al.

(10) Patent No.: US 9,155,054 B2
(45) Date of Patent: Oct. 6, 2015

(54) APPARATUS AND METHOD FOR TRANSMITTING POWER HEADROOM INFORMATION IN A MULTI-CARRIER SYSTEM

(71) Applicant: LG ELECTRONICS INC., Seoul (KR)

(72) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/223,958

(22) Filed: Mar. 24, 2014

(65) Prior Publication Data

US 2014/0206410 A1    Jul. 24, 2014

Related U.S. Application Data

(63) Continuation of application No. 13/581,232, filed as application No. PCT/KR2011/001349 on Feb. 25, 2011.

(60) Provisional application No. 61/308,294, filed on Feb. 25, 2010, provisional application No. 61/369,031, filed on Jul. 29, 2010.

(51) Int. Cl.
*G08C 17/00* (2006.01)
*H04W 52/36* (2009.01)
(Continued)

(52) U.S. Cl.
CPC ............ *H04W 52/365* (2013.01); *H04L 5/001* (2013.01); *H04W 52/34* (2013.01); *H04W 52/367* (2013.01); *H04L 5/0053* (2013.01); *H04W 52/16* (2013.01); *H04W 52/325* (2013.01)

(58) Field of Classification Search
None
See application file for complete search history.

(56) References Cited

U.S. PATENT DOCUMENTS 6,167,270 A    12/2000   Rezaiifar et al.
8,145,251 B2    3/2012   Love et al.
(Continued)

FOREIGN PATENT DOCUMENTS

CN    101340622 A    1/2009
CN    101340711 A    1/2009
(Continued)

OTHER PUBLICATIONS

3GPP TS 36.101 V8.8.0, "3rd Generation Partnership Project; Technical Specification Group Raido Access Network; Evolved Universal Terrestrial Radio Access (E-UTRA); User Equipment (UE) radio transmission and reception", Release 8, Dec. 2009, pp. 1-160.
(Continued)

*Primary Examiner* — Kibrom T Hailu
(74) *Attorney, Agent, or Firm* — Birch, Stewart, Kolasch & Birch, LLP

(57) ABSTRACT

A method of transmitting a power headroom by a user equipment (UE) in a multi-carrier system. The method includes: receiving power determination information from a base station (BS); determining a maximum transmission power value for each of a plurality of serving cells by using the power determination information and a UE specific parameter; determining a power headroom (PH) for the each of the plurality of serving cells on the basis of the maximum transmission power value for each of a plurality of serving cells; and transmitting control information to the BS, the control information comprising the maximum transmission power value and the PH for the each of the plurality of serving cells, wherein the control information includes information that indicates a specific cell for which the maximum transmission power value and the PH are provided among the plurality of serving cells.

10 Claims, 14 Drawing Sheets

(51) Int. Cl.
*H04L 5/00* (2006.01)
*H04W 52/34* (2009.01)
*H04W 52/16* (2009.01)
*H04W 52/32* (2009.01)

(56) References Cited

U.S. PATENT DOCUMENTS

| | | | |
|---|---|---|---|
| 8,605,614 B2 | 12/2013 | Nishio et al. | |
| 2007/0097962 A1 | 5/2007 | Yoon et al. | |
| 2008/0175185 A1* | 7/2008 | Ji et al. | 370/318 |
| 2009/0245191 A1 | 10/2009 | Ball et al. | |
| 2010/0158147 A1* | 6/2010 | Zhang et al. | 375/260 |
| 2010/0272091 A1* | 10/2010 | Fabien et al. | 370/345 |
| 2011/0092217 A1 | 4/2011 | Kim et al. | |

FOREIGN PATENT DOCUMENTS

| | | |
|---|---|---|
| JP | 2001-517049 A | 10/2001 |
| JP | 2009-515415 A | 4/2009 |
| JP | 2010-503338 A | 1/2010 |
| JP | 2012-510785 A | 5/2012 |
| KR | 10-2001-0074345 A | 8/2001 |
| KR | 10-2008-0069649 A | 7/2008 |
| KR | 10-2008-0094003 A | 10/2008 |
| KR | 10-2009-0030376 A | 3/2009 |
| WO | WO 2008/030867 A2 | 3/2008 |
| WO | WO 2010/065759 A2 | 6/2010 |

OTHER PUBLICATIONS

Alcatel-Lucent Shanghai Bell et al, "Power headroom reporting for carrier aggregation", 3GPP TSG RAN WG1 Meeting #60, R1-100921, San Francisco, CA, Feb. 22-26, 2010, 3-pages.

Mediatek, "Open issues for Pcmax reporting", 3GPP TSG-RAN WG2 Meeting #72, R2-106203, Jacksonville, USA, Nov. 15-19, 2010, pp. 1-4.

Nokia Siemens Networks et al., "Power Headroom Reporting for LTE-Advanced", 3GPP TSG RAN WG1 #60 Meeting, R1-101421, San Francisco, USA, Feb. 22-26, 2010, 3 pages.

Research in Motion UK Limited, "Remaining Issues on Uplink Power Control for Carrier Aggregation", 3GPP TSG RAN WG1 Meeting #59bis, R1-100569, Valencia, Spain, Jan. 18-22, 2010, pp. 1-4.

Texas Instruments, "Further Details on LTE-A UL Power Control", 3GPP TSG RAN WG1 #59bis, R1-100449, Valencia, Spain, Jan. 18-22, 2010, pp. 1-5.

Catt; "Impact of carrier aggregation on MAC layer"; 3GPP TSG-RAN WG2 #67bis; R2-095484; Oct. 12-16, 2009; 5 pages.

Research In Motion, UK Limited; "Uplink Power Control for Carrier Aggregation"; 3GPP TSG RAN WG1 Meeting #57b; R1-092415; Jun. 29-Jul. 3, 2009; 3 pages.

ZTE; "Considerations on scheduling in carrier aggregation"; 3GPP TSG RAN WG2 Meeting #66bis; R2-093886; Jun. 29-Jul. 3, 2009; 4 pages.

* cited by examiner

APPARATUS AND METHOD FOR TRANSMITTING POWER HEADROOM INFORMATION IN A MULTI-CARRIER SYSTEM

CROSS-REFERENCE TO RELATED APPLICATIONS

This application is a continuation of co-pending U.S. patent application Ser. No. 13/581,232 filed on Aug. 24, 2012, which is the National Phase of PCT/KR2011/001349 filed on Feb. 25, 2011, which claims the benefit of U.S. Provisional Application Nos. 61/308,294 filed on Feb. 25, 2010, and 61/369,031 filed on Jul. 29, 2010, the entire contents of all of the above applications are hereby incorporated by reference.

BACKGROUND OF THE INVENTION

1. Field of the Invention

The present invention relates to wireless communications, and more particularly, to an apparatus and method for transmitting power headroom information in a multi-carrier system.

2. Discussion of the Related Art

In general, a wireless communication system uses one bandwidth for data transmission. For example, a $2^{nd}$ generation wireless communication system uses a bandwidth of 200KHz~1.25MHz, and a $3^{rd}$ generation wireless communication system uses a bandwidth of 5MHz~10 MHz. To support growing transmission capacity, the $3^{rd}$ generation partnership project (3GPP) long term evolution (LTE) or the institute of electrical and electronics engineers (IEEE) 802.16m has recently expanded its bandwidth to 20MHz or higher. It may be necessary to increase the bandwidth to obtain high transmission capacity. However, if a large bandwidth is supported even when a service request level is low, it may cause significant power consumption.

Therefore, a carrier having one bandwidth and a center frequency is defined, and a multiple component carrier system (hereinafter, referred to as a multi-carrier system) capable of transmitting and/or receiving broadband data by using a plurality of carriers has been introduced. By using one or more carriers, a narrowband and a broadband are both supported. For example, if one carrier corresponds to a bandwidth of 5MHz, four carriers are used to support a bandwidth of up to 20MHz. As such, in a multi-carrier system supporting a plurality of carriers, each carrier is referred to as a component carrier (CC).

Meanwhile, as one method of effectively scheduling a user equipment (UE) by a base station (BS), power headroom (PH) information of the UE is used. A PH implies a difference between a maximum transmission power assigned to the UE and a transmission power estimated by the UE, that is, implies an extra power of the UE. The power headroom information (PHI) is essential information for effectively allocating uplink resources in wireless communication and for reducing battery consumption of the UE. When the UE provides the PHI to the BS, the BS can estimate a level of an uplink maximum transmission power that can be handled by the UE. Therefore, the BS can perform uplink scheduling in a range not beyond a limit of the estimated uplink maximum transmission power. When the UE transmits the PHI to the BS, it is called power headroom reporting (PHR).

However, since the conventional PHR provides only a PH for each carrier in case of the multi-carrier system, the BS cannot exactly know a maximum transmission power value which is used as a reference for calculation of the PH. Therefore, uplink scheduling of the BS is uncertain in some parts, and in particular, uplink transmission power scheduling depending on the PHI may cause a problem in a system (i.e., a multiple component carrier system) in which a PH for each CC needs to be individually and integrally taken into account.

SUMMARY OF THE INVENTION

The present invention provides an apparatus and method for transmitting power headroom information in a multi-carrier system.

According to an aspect of the present invention, a method of transmitting a power headroom (PH) by a user equipment (UE) in a multi-carrier system is provided. The method includes: receiving power determination information from a base station (BS); determining a plurality of maximum transmission power values for a plurality of serving cells by using the power determination information and a UE specific parameter; determining a plurality of PHs on the basis of the plurality of maximum power transmission values; and transmitting the plurality of maximum transmission power values and the plurality of PHs to the BS.

According to the aforementioned aspect of the present invention, the plurality of maximum transmission power values and the plurality of PHs may be transmitted by being respectively determined for the plurality of serving cells.

In addition, the power determination information may include information $P_{EMAX}$ for reporting maximum output power allowed to the UE, and a PH for each of the plurality of serving cells is determined based on a maximum transmission power value $P_{CMAX,c}$ for each of the plurality of serving cells.

In addition, the UE specific parameter may include a maximum power reduction (MPR) allowed to the maximum output power of the UE, and the MPR is determined based on a modulation scheme of the UE and transmission band configuration.

In addition, the plurality of maximum transmission power values and the plurality of PHs may be transmitted through a media access control (MAC) protocol data unit (PDU).

In addition, the method may further include receiving an uplink grant including uplink scheduling allocation information for the UE from the BS, wherein the plurality of maximum transmission power values and the plurality of PHs are transmitted by using a radio resource indicated by the uplink grant.

In addition, the plurality of maximum transmission power values and the plurality of PHs may include a carrier indication field (CIF) that indicates a specific cell for which these values are provided among the plurality of serving cells.

In addition, the plurality of maximum transmission power values may be transmitted as a difference value between a power value determined by using only the power determination information and a power value determined by using the power determination information and the UE specific parameter.

In addition, the method may further include: if the plurality of serving cells include a plurality of uplink carriers, determining by the UE a PH and a maximum transmission power value for each of the plurality of uplink carriers; and transmitting a PH and a maximum transmission power value for an uplink carrier having a maximum value or a minimum value among the determined PHs.

In addition, the PH and the maximum transmission power value for the uplink carrier having the maximum value or the minimum value may be transmitted together by being multiplexed when a PH and a maximum transmission power value of any one of the plurality of uplink carriers are transmitted.

In addition, the PH and the maximum transmission power for the uplink carrier having the maximum value or the minimum value may be transmitted in a subframe different from a subframe for transmitting the PH and the maximum transmission power value for any one of uplink carriers among the plurality of uplink carriers.

In addition, in a subframe for transmitting the plurality of maximum transmission power values and the plurality of PHs, the plurality of maximum transmission power values and the plurality of PHs may be transmitted through a serving cell having a maximum PH among the plurality of serving cells.

In addition, the power determination information may be received by using a radio resource control (RRC) signal.

In addition, the method may further include: starting a periodic power headroom reporting (PHR) timer; at the expiry of the periodic PHR timer, transmitting the plurality of maximum transmission power values and the plurality of PHs to the BS.

In addition, the method may further include: starting a PHR prohibit timer; and if the PHR prohibit timer expires and a path loss measured in at least one activated serving cell among the plurality of serving cells changes more than a predetermined path loss variation, transmitting the plurality of maximum transmission power values and the plurality of PHs to the BS.

According to another aspect of the present invention, there is provided a UE including: a radio frequency (RF) unit for transmitting and receiving a radio signal; and a processor coupled to the RF unit, wherein the processor is configured for: receiving power determination information from a BS; determining a plurality of maximum transmission power values for a plurality of serving cells by using the power determination information and a UE specific parameter; determining a plurality of PHs on the basis of the plurality of maximum power transmission values; and transmitting the plurality of maximum transmission power values and the plurality of PHs to the BS.

According to the present invention, a base station can acquire a correct maximum transmission power value and power headroom information with respect to each component carrier allocated to a user equipment. Therefore, transmission power control can be further effectively performed with respect to each component carrier. From the perspective of the user equipment, since the maximum transmission power value and the power headroom information for each component carrier are provided to the base station, reliable carrier aggregation scheduling can be induced, thereby being able to improve uplink transmission capability.

DETAILED DESCRIPTION OF THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity of explanation, the following description will focus on the 3GPP LTE/LTE-A. However, the technical features of the present invention are not limited thereto.

Figure 1:
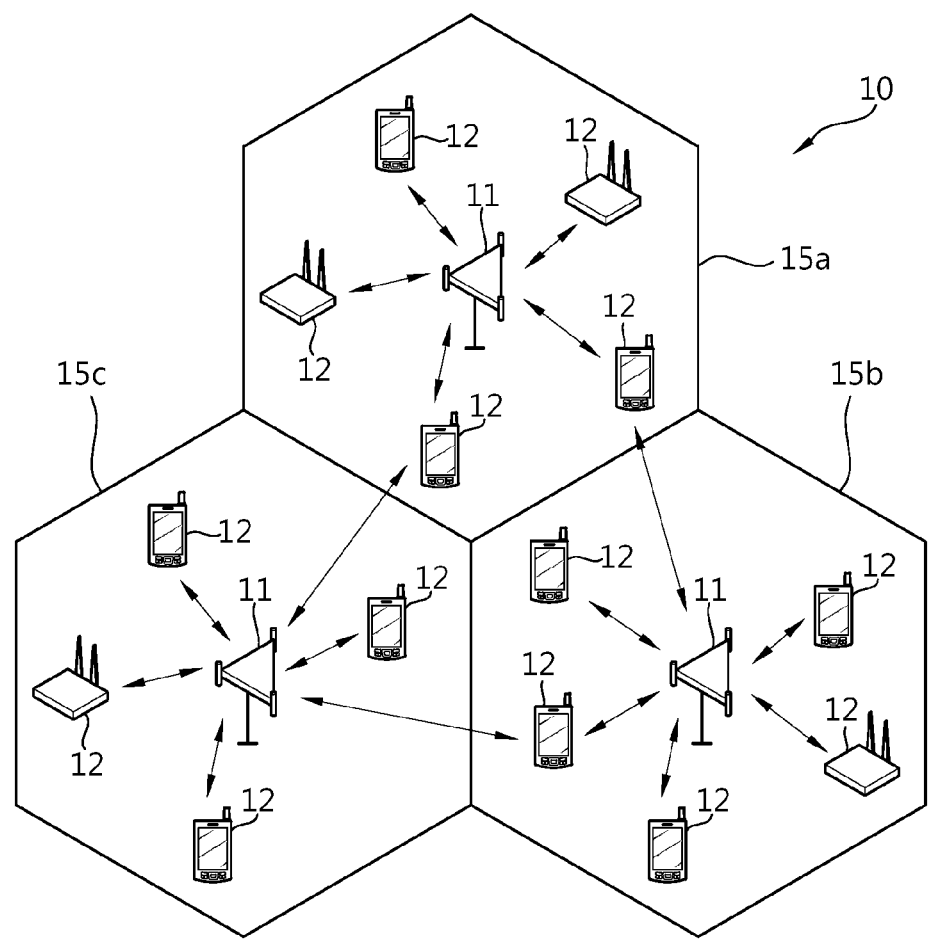
FIG. 1 shows an example of a wireless communication system according to an embodiment of the present invention.

FIG. 1 shows an example of a wireless communication system according to an embodiment of the present invention.

A wireless communication system 10 includes at least one base station (BS) 11. The BSs 11 provide communication services to specific geographical regions 15a, 15b, and 15c. The specific geographical region can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. Herein, the cell may imply a downlink frequency resource and an uplink frequency resource. A BS which provides a communication service through the serving cell is called a serving BS. The serving BS can provide one or a plurality of serving cells.

In general, a downlink denotes communication from the BS 11 to the UE 12, and an uplink denotes communication from the UE 12 to the BS 11.

Layers of a radio interface protocol between the UE 12 and the BS 11 can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states such as an idle mode, an RRC connected mode, etc., are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Figure 2:
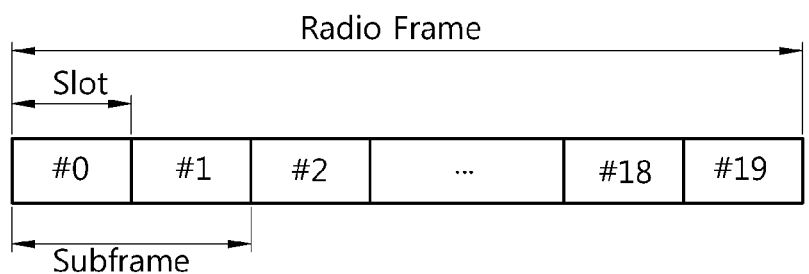
FIG. 2 shows a structure of a radio frame in $3^{rd}$ generation partnership project (3GPP) long term evolution (LTE).

The Tx antenna denotes a physical or logical antenna used for transmission of one signal or stream. The Rx antenna denotes a physical or logical antenna used for reception of one signal or stream. FIG. 2 shows a structure of a radio frame in 3GPP LTE.

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain and a plurality of subcarriers in a frequency domain. The OFDM symbol is for expressing one symbol period. The OFDM symbol can also be referred to as other terms. For example, the OFDM symbol can be referred to as an orthogonal frequency division multiple access (OFDMA) symbol or a single carrier-frequency division multiple access (SC-FDMA) symbol when SC-FDMA is used as an uplink multiple access scheme. In 3GPP LTE, it is defined such that one slot includes 7 OFDM symbols in a normal cyclic prefix (CP) and one slot includes 6 OFDM symbols in an extended CP.

The above radio frame is shown for exemplary purposes only. Thus, the number of subframes included in the radio frame or the number of slots included in the subframe or the number of OFDM symbols included in the slot may change variously.

Figure 3:
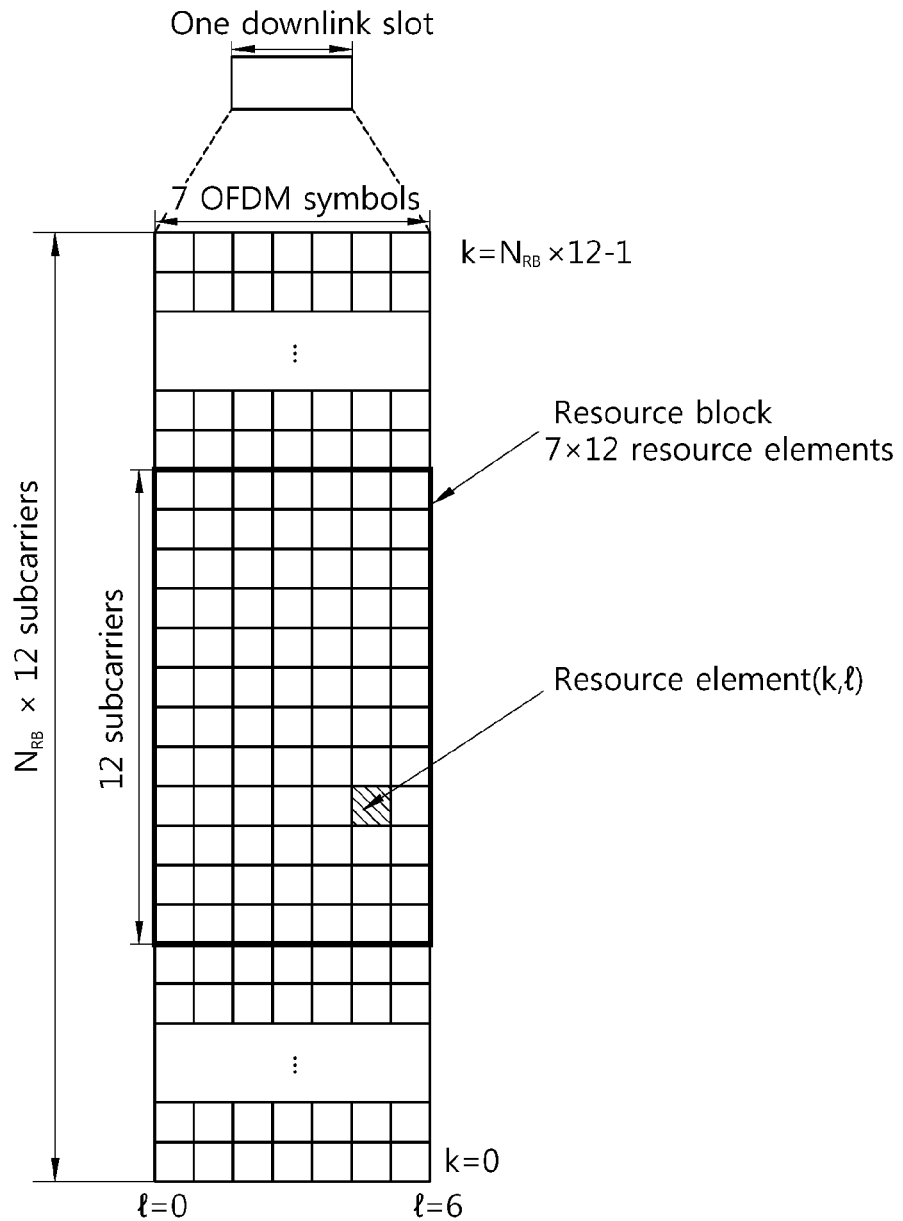
FIG. 3 shows an example of a resource grid for one downlink slot.

FIG. 3 shows an example of a resource grid for one downlink slot.

The downlink slot includes a plurality of OFDM symbols in a time domain and a plurality of $N_{RB}$ resource blocks (RBs) in a frequency domain. The RB is a resource allocation unit, and includes one slot in the time domain and a plurality of consecutive subcarriers in the frequency domain.

The number $N_{RB}$ of resource blocks included in the downlink slot depends on a downlink transmission bandwidth determined in a cell. For example, in an LTE system, $N_{RB}$ may be any one value in the range of 6 to 110. An uplink slot may have the same structure as the downlink slot.

Each element on the resource grid is referred to as a resource element (RE). The RE on the resource grid can be identified by an index pair (k, l) within the slot. Herein, k(k= 0, . . . , $N_{RB}$×12−1) denotes a subcarrier index in the frequency domain, and l(l=0, . . . , 6) denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
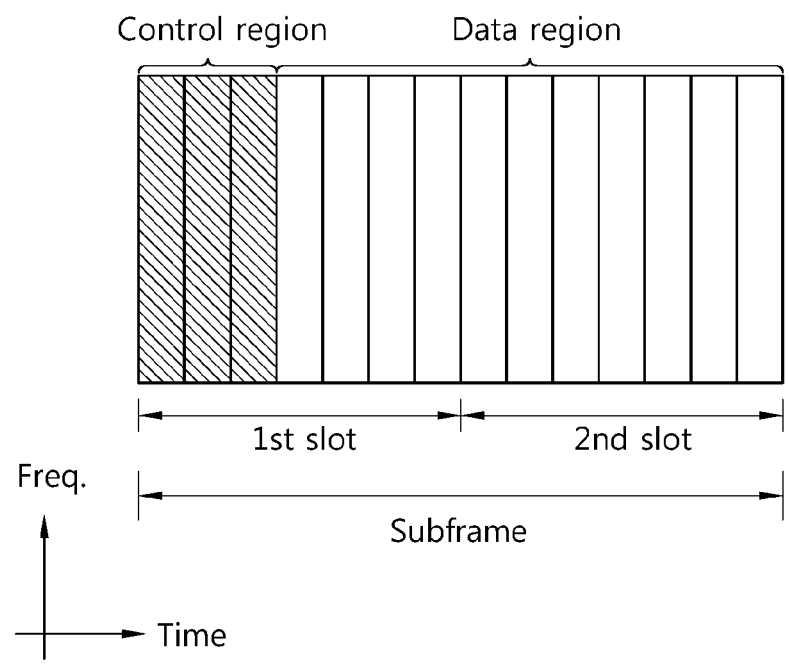
FIG. 4 shows a structure of a downlink subframe.

FIG. 4 shows a structure of a downlink subframe.

The downlink subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region. The PDSCH implies a channel for transmitting data by a BS to a UE.

In the control region, a physical control format indicator channel (PCFICH), a physical hybrid ARQ indictor channel (PHICH), a physical downlink control channel (PDCCH), or the like can be transmitted. The PCFICH is a physical channel for transmitting to the UE a format indicator that indicates a format of a PDCCH, that is, the number of OFDM symbols constituting the PDCCH. The PCFICH is included in every subframe. The format indicator can also be referred to as a control format indicator (CFI).

The PHICH carries a hybrid automatic repeat request (HARQ) acknowledgement (ACK)/not-acknowledgement (NACK) signal in response to uplink transmission.

The PDCCH can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

Figure 5:
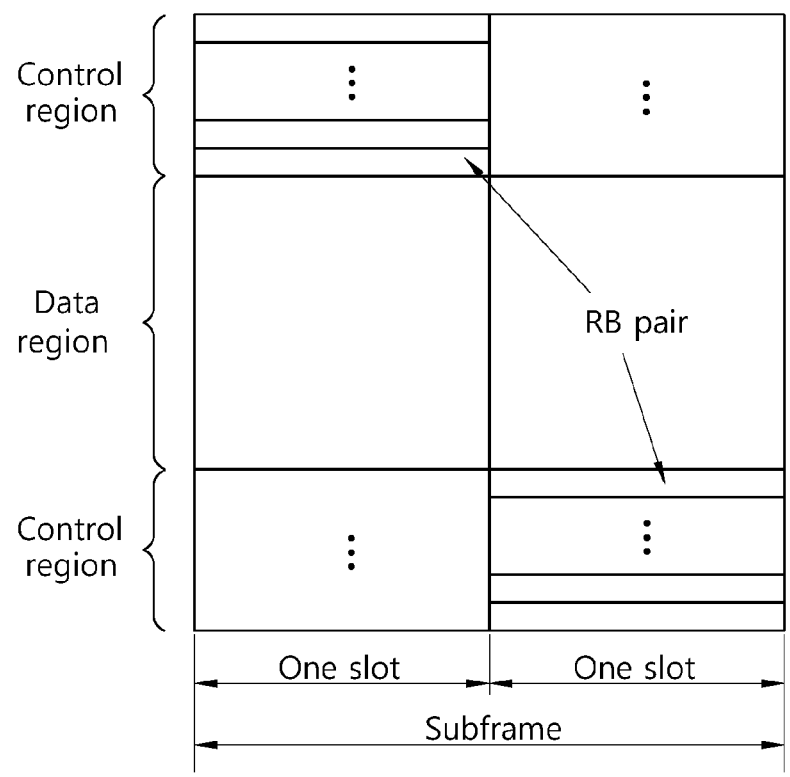
FIG. 5 shows a structure of an uplink subframe.

FIG. 5 shows a structure of an uplink subframe.

Referring to FIG. 5, the uplink subframe can be divided into a control region and a data region in a frequency domain. A physical uplink control channel (PUCCH) for transmitting uplink control information is allocated to the control region. A physical uplink shared channel (PUSCH) for transmitting data (optionally, control information can be transmitted together) is allocated to the data region.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. Since the UE transmits uplink control information over time through different subcarriers, a frequency diversity gain can be obtained.

Examples of uplink control information transmitted on the PUCCH include HARQ ACK/NACK, a channel quality indicator (CQI) indicating a downlink channel state, a scheduling request (SR) as a request for uplink radio resource allocation, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may include user data. Alternatively, the uplink data may be multiplexed data. The multiplexed data may be obtained by multiplexing a transport block for the UL-SCH and control information. Examples of the control information multiplexed to the data may include a CQI, a precoding matrix indicator (PMI), HARQ, a rank indicator (RI), etc. Alternatively, the uplink data may consist of only control information.

Meanwhile, a 3GPP LTE-A system can support a multiple component carrier system (hereinafter, a multi-carrier system). The multi-carrier system implies a system that configures a wideband by aggregating one or more carriers having a bandwidth smaller than that of a target wideband when the wireless communication system intends to support the wideband. Configuring of the wideband by aggregating a plurality of carriers having a small bandwidth is called carrier aggregation (CA).

Figure 6:
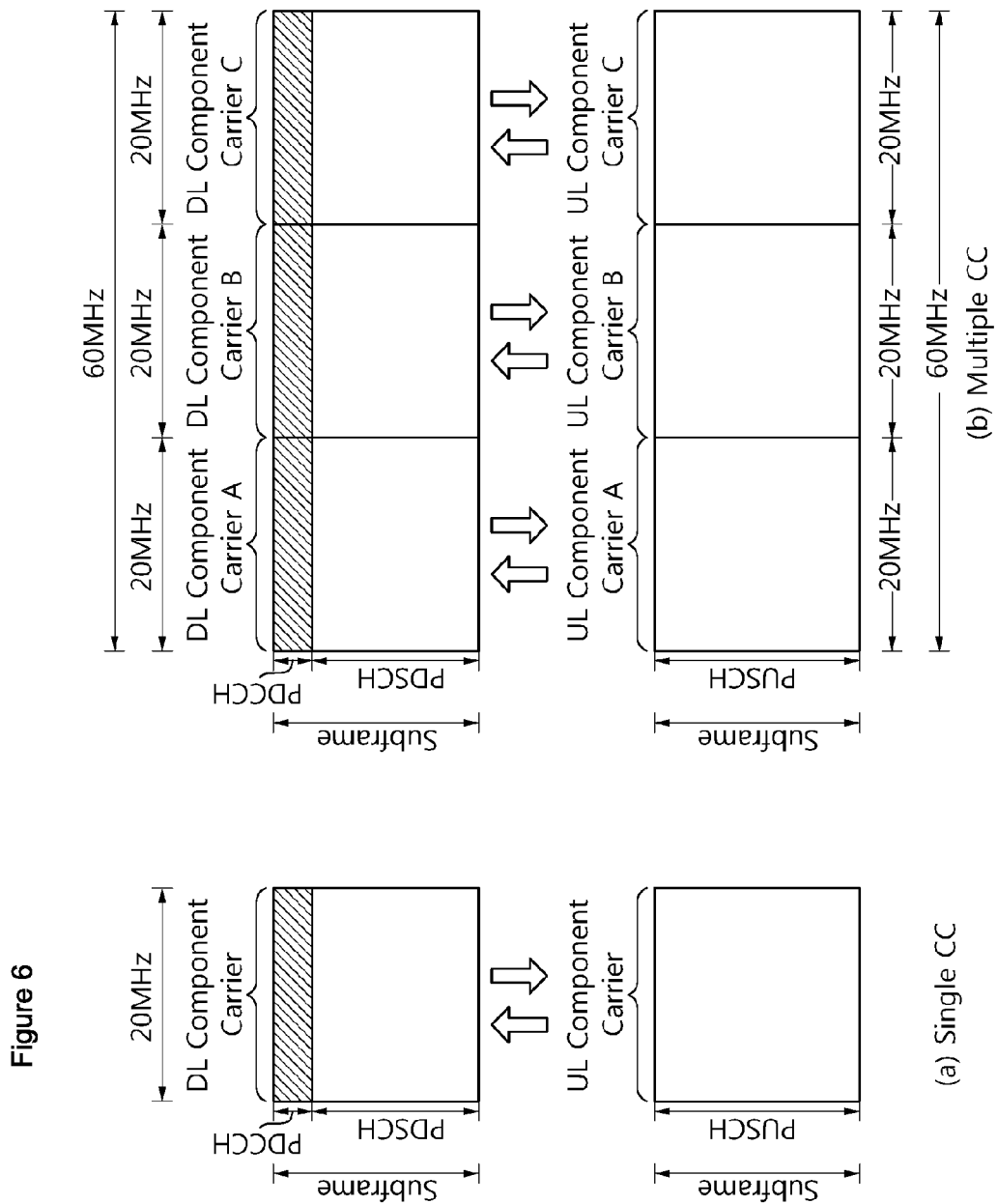
FIG. 6 shows an example of comparing a single-carrier system and a multi-carrier system.

FIG. 6 shows an example of comparing a single-carrier system and a multi-carrier system.

Referring to FIG. 6, only one carrier is supported for a UE in an uplink and a downlink in the single-carrier system. The carrier may have various bandwidths, but only one carrier is allocated to the UE. Meanwhile, a plurality of component carriers (CCs), i.e., DL CCs A to C and UL CCs A to C, can be allocated to the UE in the multi-carrier system. For example, three 20MHz CCs can be allocated to assign a 60MHz bandwidth to the UE.

The multi-carrier system can be divided into a contiguous carrier aggregation system in which carriers are contiguous to each other and a non-contiguous carrier aggregation system in which carriers are separated from each other. Hereinafter, when it is simply called a multi-carrier system or a carrier aggregation system, it should be interpreted such that both cases of contiguous CCs and non-contiguous CCs are included.

In the contiguous carrier aggregation system, a guard band may exist between CCs. A CC which is a target when aggregating one or more CCs can directly use a bandwidth that is used in the legacy system in order to provide backward compatibility with the legacy system. For example, a 3GPP LTE system can support a bandwidth of 1.4MHz, 3MHz, 5MHz, 10MHz, 15MHz, and 20MHz, and a 3GPP LTE-A system can configure a wideband of 20MHz or higher by using only the bandwidth of the 3GPP LTE system. Alternatively, the wideband can be configured by defining a new bandwidth without having to directly use the bandwidth of the legacy system.

Hereinafter, terms are defined for clarity of the present invention.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete configuration of the specific cell. Herein, the configuration implies a state of completely receiving system information required for data transmission and reception for the cell. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, a serving cell, etc.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

The serving cell is configured with the primary cell in case of a UE of which CA is not configured or which cannot provide the CA. If the CA is configured, the term 'serving cell' is used to indicate a set consisting of one or a plurality of cells among primary cells or all secondary cells.

That is, the primary cell implies one serving cell that provides security input and NAS mobility information in an RRC establishment or re-establishment state. According to UE capabilities, it can be configured such that at least one cell constitutes a serving cell together with the primary cell, and in this case, the at least one cell is called the secondary cell.

Therefore, a set of serving cells configured only for one UE can consist of only one primary cell, or can consist of one primary cell and at least one secondary cell.

A downlink Component Carrier (CC) corresponding to the primary cell is called a downlink primary component carrier (DL PCC), and an uplink CC corresponding to the primary cell is called an uplink primary component carrier (UL PCC). In addition, in a downlink, a CC corresponding to the secondary cell is called a DL secondary CC (DL SCC). In an uplink, a CC corresponding to the secondary cell is called a UL SCC.

The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode.

The SCC is a CC allocated to the UE in addition to the PCC. The SCC is an extended carrier used by the UE for additional resource allocation or the like in addition to the PCC, and can be divided into an activation state and a deactivation state.

The primary cell and the secondary cell have the following features.

First, the primary cell is used for PUCCH transmission.

Second, the primary cell is always activated, whereas the secondary cell is a cell which is activated/deactivated according to a specific condition.

Third, when the primary cell experiences a radio link failure (RLF), RRC re-establishment is trigger, whereas when the secondary cell experiences the RLF, the RRC re-establishment is not triggered.

Fourth, the primary cell can change by a handover procedure accompanied by a random access channel (RACH) procedure or security key modification.

Fifth, non-access stratum (NAS) information is received through the primary cell.

Sixth, the primary cell always consists of a pair of a DL PCC and a UL PCC.

Seventh, for each UE, a different CC can be configured as the primary cell.

Eighth, a procedure such as reconfiguration, adding, and removal of the primary cell can be performed by an RRC layer. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated in a downlink and the number of CCs aggregated in an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70MHz band, it can be configured such as 5MHz CC (carrier #0)+20 MHz CC (carrier #1)+20MHz CC (carrier #2)+20MHz CC (carrier #3)+5MHz CC (carrier #4).

Hereinafter, a power headroom (PH) will be described.

FIG. 7 shows a PH.

Figure 7:
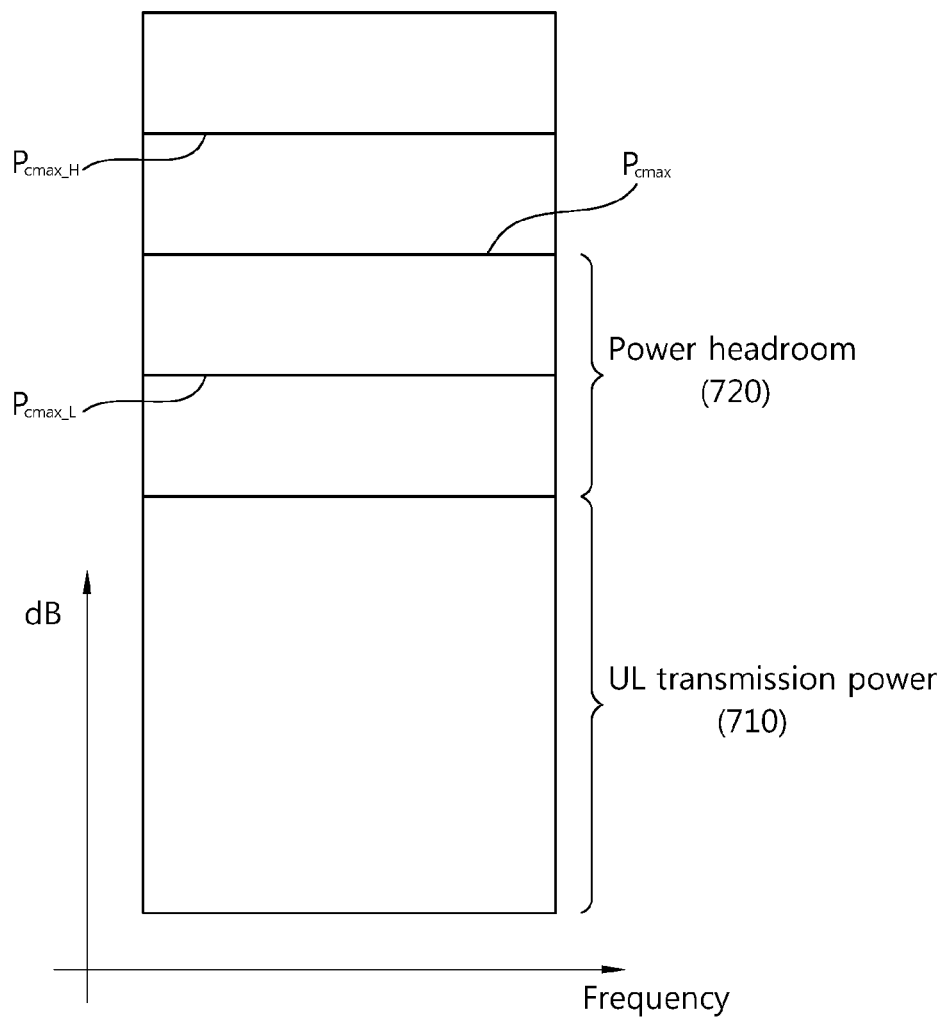
FIG. 7 shows a power headroom.

Referring to FIG. 7, a PH 720 implies a power difference between a maximum transmission power $P_{cmax}$ assigned to a current UE and an uplink transmission power 710 used for uplink transmission by the UE. For example, it is assumed that the UE has a maximum available transmission power of 10W. In this case, if the UE uses an uplink transmission power of 9W in a frequency band of 10MHz, the UE can additionally use 1W, and thus has a PH of 1W. More specifically, the PH implies a difference value between the maximum transmission power $P_{cmax}$ assigned the UE and an uplink transmission power estimated for uplink transmission. The PH is temporally estimated in a subframe unit or a transmission time interval (TTI) unit. The PH can be estimated only in a subframe in which a PUSCH is transmitted or can be estimated in a subframe in which the PUSCH and a PUCCH are simultaneously transmitted.

The maximum transmission power $P_{cmax}$ can be determined within a specific range according to the following equation when the UE receives power determination information from a BS.

$$P_{cmax\_L} \leq P_{cmax} \leq P_{cmax\_H} \quad \text{[Equation 1]}$$

Herein, $P_{cmax}$ denotes a maximum transmission power assigned to the UE, $P_{cmax\_L}$ denotes a minimum value of $P_{cmax}$, and $P_{cmax\_H}$ denotes a maximum value of $P_{cmax}$. $P_{cmax\_L}$ and $P_{cmax\_H}$ can be calculated by the following equation.

$$P_{CMAX\_L} = \text{MIN}\{P_{EMAX} - \Delta T_C, P_{Powerclass} - MPR - A\_MPR - \Delta T_C\}$$

$$P_{CMAX\_H} = \text{MIN}\{P_{EMAX}, P_{Powerclass}\} \quad \text{[Equation 2]}$$

In Equation 2 above, MIN{a,b} denotes a smaller value between 'a' and 'b', and $P_{EMAX}$ denotes a maximum allowed UE output power as information given by RRC signaling of the BS. $P_{EMAX}$ is given by an information element (IE) P-Max. The IE P-Max is used to limit uplink transmission power of the UE at a carrier frequency. $\Delta T_C$ denotes a power amount applied when there is uplink transmission (i.e., PUSCH transmission) at a band edge as a parameter determined depending on a band property. $\Delta T_C$ is 1.5dB or 0dB according to a bandwidth. $P_{powerclass}$ denotes a power value depending on several power classes defined to support various UE specifications (i.e., a power amplifier's property). In general, an LTE system supports a power class 3, and $P_{powerclass}$ for the power class 3 is 23dBm. Maximum power reduction (MPR) denotes a power regulation amount regulated by the UE, and is determined according to a modulation scheme (QPSK, 16QAM, etc.) and transmission band configuration. Additional maximum power reduction (A_MPR) denotes an additional power regulation amount that is signaled by the BS. When calculating the maximum transmission power described in Equations 1 and 2 above, $P_{EMAX}$, $\Delta T_C$, $P_{powerclass}$, A_MPR, etc., can be an example of power determination information determined by the BS.

Uplink transmission power is determined by considering a PUSCH power offset value received from the BS, a transmission power control (TPC) value, a path loss (PL) between the BS and the UE, a modulation scheme included in a UL grant, the number of resource blocks, etc. That is, the uplink transmission power is estimated or determined by considering a scheduling parameter and an environment between the BS and the UE.

The UE determines a maximum transmission power by using the power determination information received from the BS, and reports a difference with respect to the estimated uplink transmission power by including the difference into power headroom information. Such reporting is called power headroom reporting (PHR).

That is, in order to help the BS to properly schedule an uplink transmission resource to different UEs, the PHR is used to provide a serving BS with information regarding a difference between a nominal maximum transmission power of the UE and an estimated power for UL-SCH (PUSCH) transmission for each activated serving cell and a difference between an estimated power for a UL-SCH (PUSCH) and a PUCCH of a primary cell and the nominal maximum transmission power of the UE.

The BS can perform configuration regarding the PHR by using an RRC signal. For example, to trigger the PHR, the BS can set a periodic PHR timer, a PHR prohibit timer, and a PL variation (it can be given in a unit of dB) to the UE by using an RRC signal.

When the periodic PHR timer expires, the UE triggers the PHR, and restarts the periodic PHR timer after the PHR is performed.

Alternatively, the UE can trigger the PHR when the PHR prohibit timer expires or has already expired for at least one activated serving cell and when a PL measured in the at least one activated serving cell changes more than the PL variation.

The BS can determine a specific amount of uplink resources to be allocated to the UE by using the PHR. Since radio resources allocated in an uplink are orthogonal in LTE, a radio resource allocated to a specific UE cannot be used by another UE. Therefore, if radio resources allocated to the specific UE are too many to be used, it results in waste of overall system capacity.

The PHR is transmitted through a subframe which is allocated to the UE by using a UL grant, and in this case, the PHR is in regards to the subframe. In this sense, the PHR is not direct measurement but estimation. The UE cannot directly measure a PH for a subframe in which the PHR is transmitted, and thus the UE transmits the PH through estimation.

The PH can be calculated for a subframe i by the following equation.

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\} [dB] \quad \text{[Equation 3]}$$

In Equation 3 above, PH(i) denotes a PH for the subframe i. $M_{PUSCH}(i)$ denotes a bandwidth for PUSCH resource allocation for the subframe i, and is expressed by the number of resource blocks (RBs). $P_{O\_PUSCH}$, f(i) denotes a parameter given by using a higher layer signal. α denotes a weight applied to a path loss (PL). $\Delta_{TF}(i)$ denotes a parameter related to a modulation and coding scheme (MCS) and can be given by using a higher layer signal.

As described above, the UE determines (or estimates) the maximum transmission power $P_{cmax}$ and the uplink transmission power, and thereafter transmits PHI (hereinafter, PHI is also referred to as a PH for convenience of explanation) to the BS. However, the BS cannot exactly know the maximum transmission power determined by the UE. For example, this is because the MPR is a UE specific parameter that is variably determined by the UE in Equation 2 above, and thus the maximum transmission power $P_{cmax}$ of the UE is also variable. Therefore, the BS can estimate only the maximum transmission power of the UE by using the PHI.

When the UE performs uplink transmission by using a plurality of CCs as in the multi-carrier system, the BS performs uncertain uplink scheduling within the estimated maximum transmission power, and thus optionally can perform scheduling to the UE by using modulation/channel bandwidth/RB that require a transmission power greater than or equal to the maximum transmission power. Then, the UE transmits an uplink signal within its maximum transmission power, which leads to a problem in that a reception rate of the BS decreases. A method for solving this problem will be described below.

Figure 8:
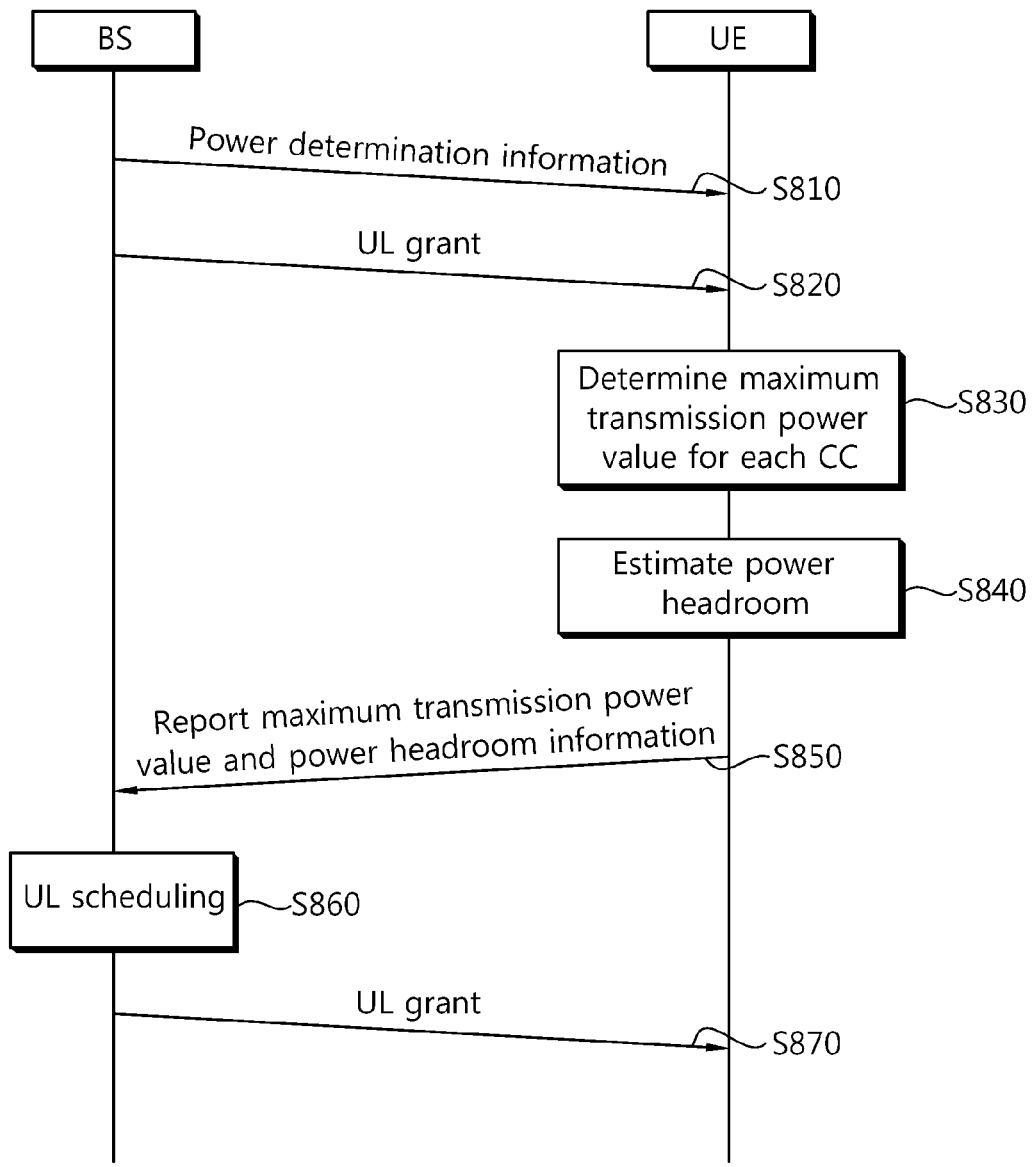
FIG. 8 shows an example of transmitting a power headroom according to the present invention.

FIG. 8 shows an example of transmitting a PH according to the present invention.

Referring to FIG. 8, a BS transmits power determination information to a UE (step S810). The power determination information implies information used by the UE to determine a maximum transmission power for each CC. In other words, the power determination information is information used when the UE determines a maximum transmission power for a serving cell. For example, the power determination information may include a maximum allowed UE output power $P_{EMAX}$. The power determination information can be transmitted by using a higher layer signal such as a radio resource control (RRC) signal. The power determination information can be given for each serving cell (i.e., a CC included in the serving cell).

The BS transmits a UL grant to the UE (step S820). The UL grant is information corresponding to a format 0 of downlink control information (DCI) transmitted through a PDCCH, and includes information such as a resource block, a modulation and coding scheme (MCS), TPC, etc. The following table shows an example of the UL grant.

TABLE 1

- Carrier indicator - 0 or 3 bits.
- Flag for format0/format1A differentiation - 1 bit, where value 0 indicates format 0 and value 1 indicates format 1A
- Frequency hopping flag - 1 bit
- Resource block assignment and hopping resource allocation -
  $\lceil \log_2(N_{RB}^{UL}(N_{RB}^{UL} + 1)/2) \rceil$ bits
    - For PUSCH hopping:
        - $N_{UL\_hop}$MSB bits are used to obtain the value of $\tilde{n}_{PRB}(i)$
        - $(\lceil \log_2(N_{RB}^{UL}(N_{RB}^{UL} + 1)/2) \rceil - N_{UL\_hop})$ bits provide the resource allocation of the first slot in the UL subframe
    - For non-hopping PUSCH:
        - $(\lceil \log_2(N_{RB}^{UL}(N_{RB}^{UL} + 1)/2) \rceil)$ bits provide the resource allocation in the UL subframe
- Modulation and coding scheme and redundancy version - 5 bits
- New data indicator - 1 bit
- TPC command for scheduled PUSCH - 2 bits
- Cyclic shift for DM RS and OCC index - 3 bits
- UL index - 2 bits (this field is present only for TDD operation with uplink-downlink configuration 0)
- Downlink Assignment Index (DAI) - 2 bits (this field is present only for TDD operation with uplink-downlink configurations 1-6)
- CQI request - 1 or 2 bits The UE determines a maximum transmission power value for each CC (or serving cell) (step S830). For example, the UE can determine a maximum transmission power $P_{CMAX,c}$ within a range determined by using a UE specific parameter (e.g., MPR, A_MPR) and power determination information $P_{EMAX}$ for each serving cell as expressed by Equations 1 and 2.

The UE estimates a PH (step S840). That is, the UE generates PH information corresponding to a difference between an estimated uplink transmission power and a maximum transmission power value for each CC (or serving cell). That is, the UE can generate PH information for each serving cell. For example, PH information at a subframe i can be calculated and reported for a serving cell c as expressed by Equation 4 below.

$$PH_{type1,c}(i)=P_{CMAX,c}(i)-\{10 \log_{10}(M_{PUSCH,c}(i))+P_{O\_PUSCH,c}(j)+\alpha_c(j)\cdot PL_c+\Delta_{TF,c}(i)+f_c(i)\}[dB] \quad \text{[Equation 4]}$$

In comparison with Equation 3, a parameter is given for each serving cell. That is, $M_{PUSCH,c}(i)$ denotes a bandwidth of PUSCH resource allocation for the subframe i of the serving cell c, and is expressed by the number of resource blocks (RBs). $P_{O\_PUSCH,c}$, $f_c(i)$ denotes a parameter given by using a higher layer signal. $\alpha_c$ denotes a weight applied to a path loss (PL), and $\Delta_{TF,c}(i)$ denotes a signal given by using a higher layer signal as an MCS-related parameter. A PH can be classified into a type 1 and a type 2. The type 1 is a PH in a case where there is PUSCH transmission, and the type 2 is a PH in a case where there is PUSCH transmission and PUCCH transmission. The UE can transmit the type 1 PH and/or the type 2 PH for a primary cell, and can transmit the type 1 PH for a secondary cell.

The UE transmits a maximum transmission power value and PH information to the BS (step S850). That is, unlike the conventional method, in addition to transmitting only the PH information, the UE transmits the maximum transmission power value for each serving cell (or CC) together with the PH information. In this case, the maximum transmission power value and the PH information can be transmitted only for an activated serving cell. The maximum transmission power value can be transmitted in various manners.

For example, the maximum transmission power value can be transmitted directly. In this case, the maximum transmission power value itself can be transmitted in such a manner that a table in which an index and a power value are defined is predetermined and the maximum transmission power value is reported by transmitting the index by using 6 bits for example.

Alternatively, the maximum transmission power value can be indirectly known to the BS. For example, the power determination information is information which can be known to both the BS and the UE. Therefore, a maximum transmission power value calculated by assuming that some parameter values included in the power determination information are predetermined values can be known in advance to the BS and the UE. Then, the UE can transmit a difference between the maximum transmission power value calculated by assuming the predetermined value and a maximum transmission power value variably determined by the UE. In this case, it is also possible to pre-define an index and a difference value (dB) and thereafter transmit only the index value.

Alternatively, the UE can transmit some parameter values to the BS so as to know the maximum transmission power value. For example, by transmitting MPR and A_MPR values of Equation 2 to the BS, it is possible to allow the BS to know the maximum transmission power value of the UE.

The aforementioned maximum transmission power value and PH information can be transmitted by using an L1 (e.g., physical layer) signal, an L2 (e.g., MAC layer) signal, or a higher layer (e.g., RRC layer) signal. When transmitted using the MAC layer signal, a control element (CE) of a MAC protocol data unit (PDU) can be used. The MAC CE may include a field indicating whether a serving cell having a cell index i is activated, PH information for the activated serving cell, per-cell maximum transmission power value used for calculation of the PH information, etc. Per-cell PH information and maximum transmission power value can be transmitted at a location on a predetermined format in the MAC CE. A specific serving cell for which the PH information and the maximum transmission power value are transmitted can be identified by the field that indicates whether the serving cell is activated.

The PH can be transmitted as a value determined by a predetermined table below.

TABLE 2

| Reported value | Measured quantity value (dB) |
| --- | --- |
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| . | . |
| . | . |
| . | . |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

Referring to Table 2, the PH is in the range of −23dB to +40dB. For example, if the PH is expressed with 6 bits, $2^6=64$ types of indices can be expressed, and thus the PH can be divided into 64 levels in total. If a value of bits for expressing the PH is 0 (i.e., '000000' when expressed with 6 bits), the PH is expressed by $-23 \leq P_{PH} \leq -22$ dB.

A value expressed with a minus value in Table 2 above indicates that a radio resource allocated by using a UL grant requires a greater transmission power than that available for the UE. If a PHR value of the UE is a minus value, the BS can reduce a radio resource in a next UL grant for the UE. For example, the number of RBs allocated in a frequency domain may be reduced or an MCS level may be decreased.

The BS performs uplink scheduling (step S860). The BS can exactly know whether the UE has a room for a transmission power by using a maximum transmission power and PH information reported for each CC from the UE. That is, unlike the conventional technique, the BS can know each CC's maximum transmission power value determined by the UE, and thus there is an advantage in that a value used as a reference of the PH information can be known more correctly. On the basis of a PH value and a maximum transmission power for a plurality of CCs, the BS can determine whether a sum of transmission powers transmitted finally by the UE is close to a maximum available transmission power of the UE. If the UE has a room for a transmission power, the BS can allocate more RBs in next uplink transmission, and can increase the MCS level.

The BS transmits a UL grant to the UE (step S870). In this case, the BS can transmit the UL grant by including an MCS modified according to the UL scheduling, TPC information, etc.

Hereinafter, a method of transmitting 1) PHI or 2) both PHI and maximum transmission power by a UE in a multi-carrier system will be described. The PHI may imply only power headroom information or may imply both power headroom information and a maximum transmission power value.

Cross carrier power headroom reporting (PHR) can be used in the multi-carrier system. In the conventional 3GPP Rel-8, one carrier is used in an uplink, and as a result, PHI is transmitted through one UL carrier. On the other hand, in LTE-A, a plurality of UL CCs can be allocated to the UE. In this case, in LTE-A, PHI of a specific UL CC can be transmitted through a PUSCH of the specific UL CC, but also can be transmitted through a PUSCH of another UL CC.

For example, three UL CCs (i.e., UL CC#1, UL CC#2, UL CC#3) may be allocated to the UE. Even if there is no PUSCH transmission of the UL CC#1 at a time of transmitting PHI in the UL CC#1, the UE can transmit the PH through another UL CC, i.e., the UL CC#2 or UL CC#3, through the UL CC#2 or the UL CC#3. As such, the cross carrier PHR is defined as PHR in which PHI of a UL CC can be transmitted through not the UL CC but another UL CC. When allowing the cross carrier PHR, since PUSCH transmission may exist in another UL CC even if there is no PUSCH transmission of a specific UL CC at a time of transmitting the PHI in the UL CC, a PHI drop probability decreases. Therefore, the BS can more correctly know the transmission power of the UE.

In the cross carrier PHR, the BS is allowed to know a specific UL CC of PHI by transmitting carrier indicator (CI) information together with the PHI.

<Configuration Method for PHI Transmission in Multi-Carrier System>

When configuration is performed for PHI transmission in a multi-carrier system, a BS can use at least one of three methods, i.e., 1) a configuration method using signaling for each CC, 2) a configuration method using the same signaling for all CCs, and 3) a method of combining the method 1) and the method 2).

Figure 9:
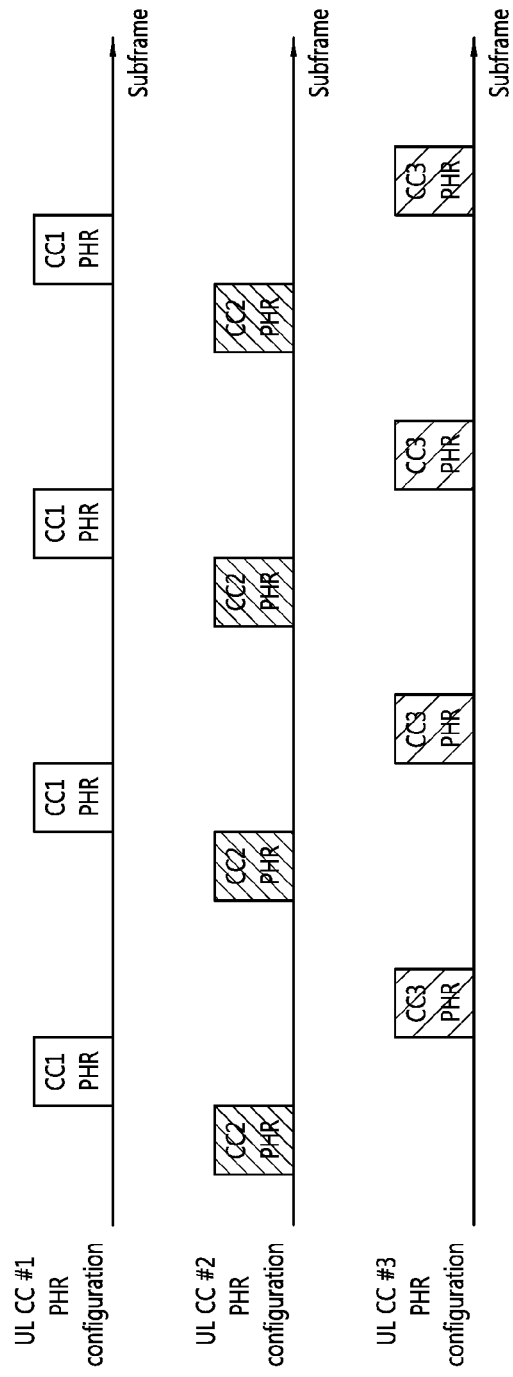
FIG. 9 shows an example of a method of configuring power headroom reporting (PHR) for each component carrier (CC) by using signaling for each CC.

FIG. 9 shows an example of a method of configuring PHR for each CC by using signaling for each CC.

Referring to FIG. 9, a BS can perform configuration independently by performing signaling on configuration information for PHR for each UL CC allocated to a UE. For example, configuration information for each PHR can be signaled through a DL CC linked to each UL CC. Then, a transmission period of the PHI, an offset parameter to be applied, or the like can be independently configured for each UL CC.

Figure 10:
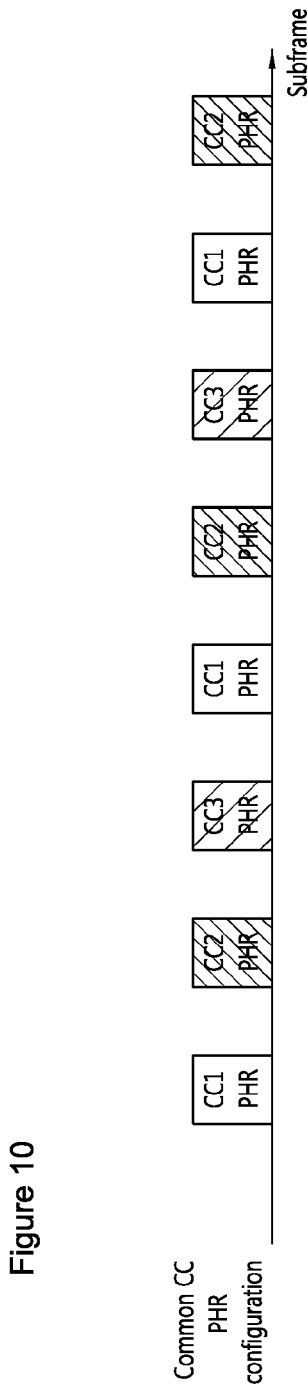
FIG. 10 shows an example of a method of configuring PHR for all CCs by using the same signaling.

FIG. 10 shows an example of a method of configuring PHR for all CCs by using the same signaling.

Referring to FIG. 10, a BS can transmit configuration information for PHR for all UL CCs allocated to a UE through a specific DL CC. The specific DL CC may be a DL CC predetermined for each cell.

Next, the method of combining the aforementioned methods 1) and 2) is a method in which the PHR is configured independently for each CC similarly to the method 1) for a specific UL CC among a plurality of UL CCs allocated to the UE and in which the PHR is configured for other UL CCs through one configuration information signaling. For example, the specific UL CC may be a UL CC predetermined in a cell.

Although it is described in FIG. 9 and FIG. 10 above that a time (i.e., a subframe) for transmitting PHI for each UL CC does not overlap and the number of times of performing PHI transmission is set identically, the present invention is not limited thereto. That is, it is also possible to configure such that PHI is transmitted simultaneously in a plurality of UL CCs and such that the number of times of performing PHI transmission is set differently by configuring a PHI transmission period differently for each UL CC. For example, if a channel state of the specific UL CC is good, UL data or control signals can be transmitted more frequently than other UL CCs. In this case, it is possible to configure such that PHI is transmitted more frequently in the specific UL CC.

<Method of Applying Cross Carrier PHR>

A method of applying cross carrier PHR may include 1) a method of allowing cross carrier PHR for all UL CCs and 2) a method of allowing cross carrier PHR only for a specific UL CC.

Figure 11:
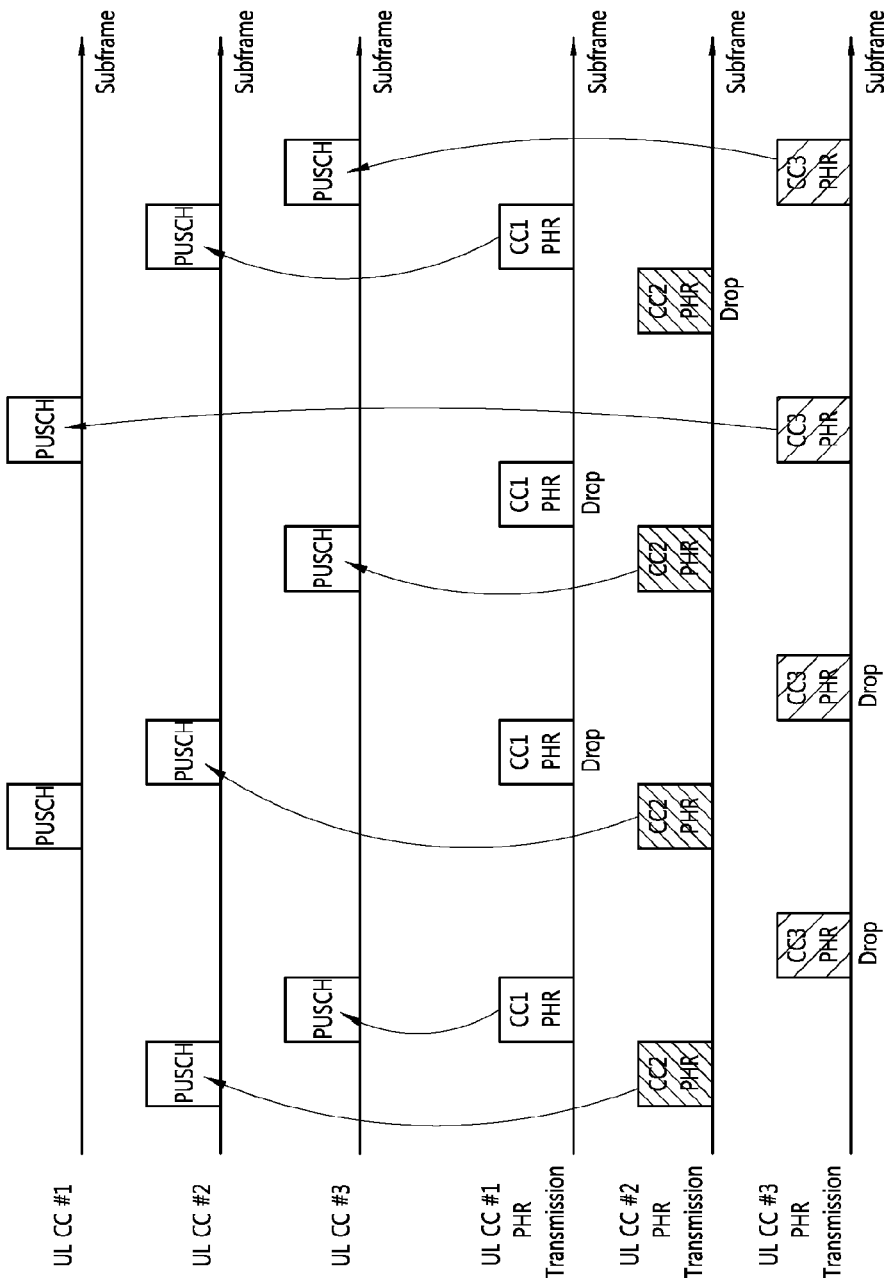
FIG. 11 shows an exemplary case of allowing cross carrier PHR for all uplink (UL) CCs.

FIG. 11 shows an exemplary case of allowing cross carrier PHR for all UL CCs.

Referring to FIG. 11, UL CCs allocated to a UE are a UL CC#1, a UL CC#2, and a UL CC#3. In this case, the cross carrier PHR is allowed for all UL CCs. For example, even if there is no PUSCH transmission of the UL CC#1 at a PHI transmission time of the UL CC#1, if there is PUSCH transmission in a different UL CC, PHI of the UL CC#1 can be transmitted through a PUSCH of the different UL CC. Likewise, in the UL CC#2 and the UL CC#3, PHI can be transmitted through other UL CCs. Therefore, a PHI drop probability is significantly reduced.

Figure 12:
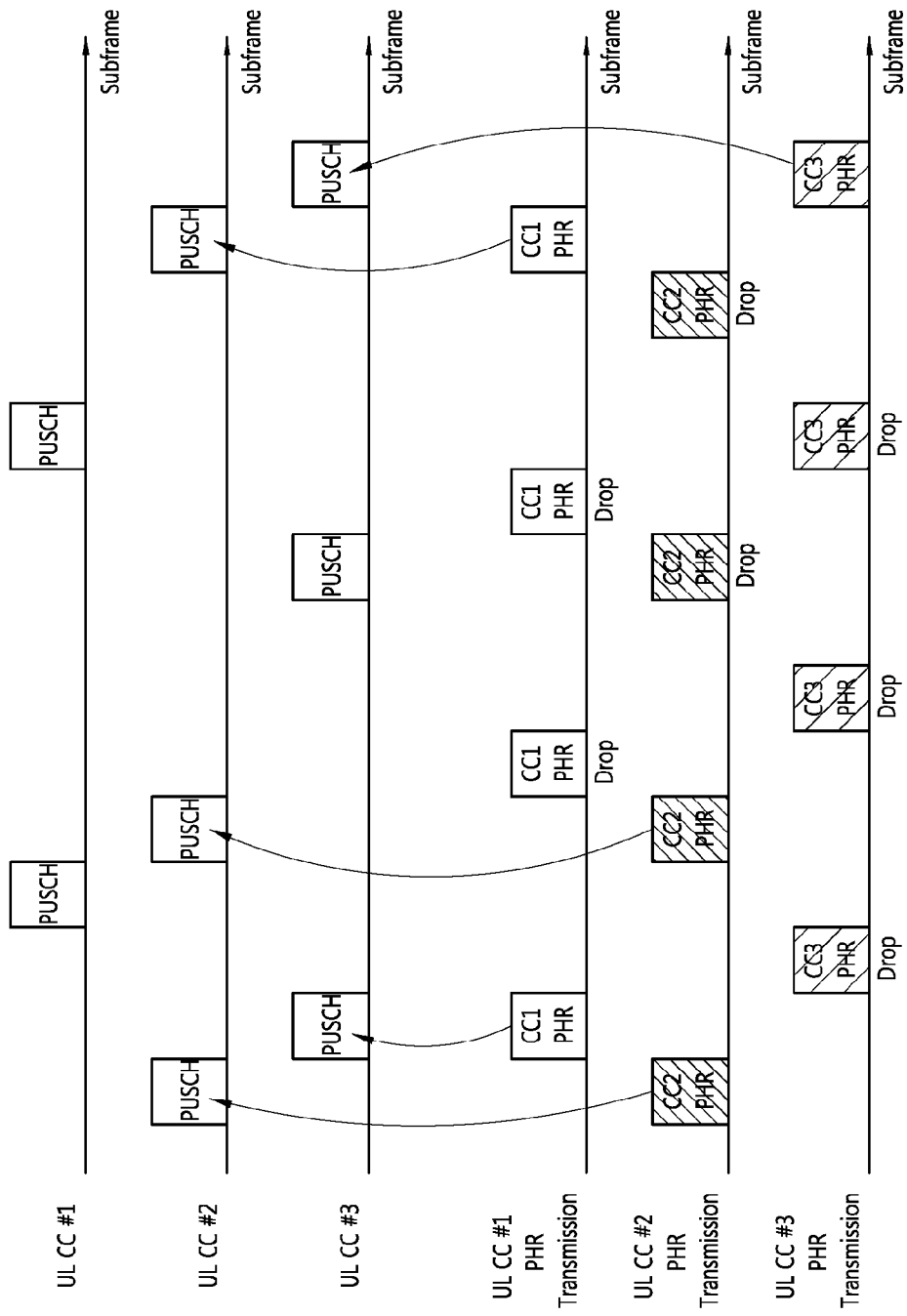
FIG. 12 shows an exemplary case of allowing cross carrier PHR only for a specific UL CC.

FIG. 12 shows an exemplary case of allowing cross carrier PHR only for a specific UL CC.

Referring to FIG. 12, UL CCs allocated to a UE are a UL CC#1, a UL CC#2, and a UL CC#3. In this case, if the UL CC#1 is a UL CC in which transmission of control information such as ACK/NACK, a channel quality indicator (CQI), a scheduling request (SR), etc., cross carrier PHR may be allowed for the UL CC#1 and may not be allowed for the remaining UL CC#2 and UL CC#3. That is, the UL CC#1 can transmit PHI through a PUSCH of the UL CC#2 or the UL CC#3 at a PUSCH transmission time of the UL CC#2 and the UL CC#3, but cannot transmit the PHI by using other UL CCs in the UL CC#2 or the UL CC#3.

In the above example, if the UL CC#1 is more frequently used for transmission of UL data or control information, power control of the UL CC#1 becomes more important. Therefore, the BS can allow cross carrier PHR for the UL CC#1 and thus reduce a PHI drop probability, thereby being able to increase reliability of transmission power control.

In a case where the cross carrier PHR is allowed for a specific UL CC, if there is PHI for PUCCH transmission, a method can be considered in which the cross carrier PHR is allowed only for the PHI for PUCCH transmission and PUSCH PHI is limited only for PUSCH transmission of the specific UL CC similarly to Rel-8.

<PHR when a Plurality of PUSCHs are Transmitted Simultaneously>

When cross carrier PHR is allowed, a PUSCH can be transmitted in a plurality of CCs at a time of transmitting PHI for a specific CC. In this case, there is a need to determine a specific UL CC of which a PUSCH is used for transmission of PHI of the specific CC among a plurality of UL CCs.

Figure 13:
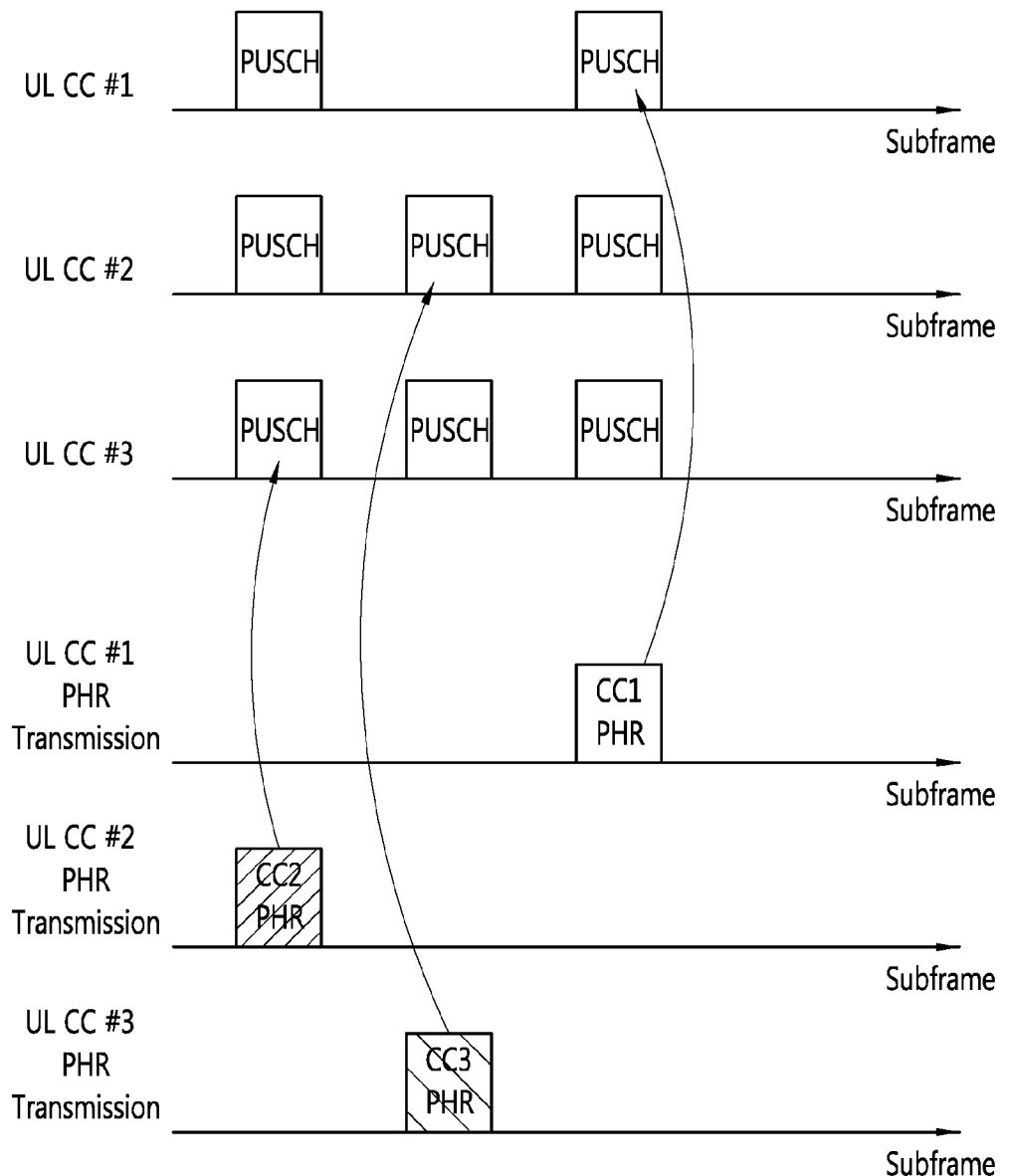
FIG. 13 shows a case where a physical uplink shared channel (PUSCH) is transmitted in a plurality of UL CCs at a time of transmitting power headroom information (PHI) for one UL CC.

FIG. 13 shows a case where a PUSCH is transmitted in a plurality of UL CCs at a time of transmitting PHI for one UL CC.

Referring to FIG. 13, a PUSCH can be transmitted simultaneously in a UL CC#1 to a UL CC#3 at a time of transmitting PHI of a UL CC#2. In this case, since the cross carrier PHR is allowed, PHI of the UL CC#2 can be transmitted as any UL CC among the UL CC#1 to the UL CC#3. However, it is preferable to transmit the PHI through a UL CC having a plus PH value in order to increase a reception rate of the BS. This is because a UL CC having a minus PH value indicates that a signal is transmitted with lower power than that required by the BS. Therefore, if the cross carrier PHR is allowed and a PUSCH is transmitted simultaneously through a plurality of UL CCs at a time of transmitting the PHI, the PHI can be transmitted through a UL CC having a maximum PH among the plurality of UL CCs. In FIG. 13, if a PH of the UL CC#3 is greatest in a subframe for transmitting PHI of the UL CC#2, the PHI of the UL CC#2 is transmitted through a PUSCH of the UL CC#3. In addition, if a PH of the UL CC#2 is greatest in a subframe for transmitting PHI of the UL CC#3, the PHI of the UL CC#3 is transmitted through a PUSCH of the UL CC#2. If a PH of the UL CC#1 is greatest in a subframe for transmitting PHI of the UL CC#1, the PHI can be transmitted through a PUSCH of the UL CC#1.

That is, if PHI transmission is required in any UL CC among a plurality of UL CCs allocated to the UE and if PUSCH transmission has to be performed through a plurality of UL CCs in a subframe in which the PHI transmission is required, then the UE can compare a PH for the plurality of UL CCs and then can transmit the PHI through any one of UL CCs having a plus PH or a UL CC having a maximum PH. In this case, the PHI may include a carrier indicator field (CIF).

<Additional PHR>

The purpose of transmitting PHI is to allow a BS to recognize a power amount used by a UE and thus to properly regulate an MCS, a bandwidth, etc. If the UE reports a minus PH (in a unit of dB having a minus value), it is a case where power scheduled by the BS is greater than a power value that can be transmitted by the UE to the maximum extent possible. Therefore, the BS has to re-regulate and schedule the MCS, the bandwidth, TPC, etc., in a next UL grant with respect to a UE that reports a minus PH. If the UE reduces power in transmission due to power limitation, a reception rate of the BS deteriorates and a retransmission request probability is increased, thereby decreasing an overall network throughput. By considering this aspect, it is preferable to minimize a duration in which power of the UE is limited.

For this, a method is proposed in which the UE additionally transmits PHI of a CC having a maximum PH or a CC having a minimum PH (including a minus value) in addition to the conventional PHR.

Figure 14:
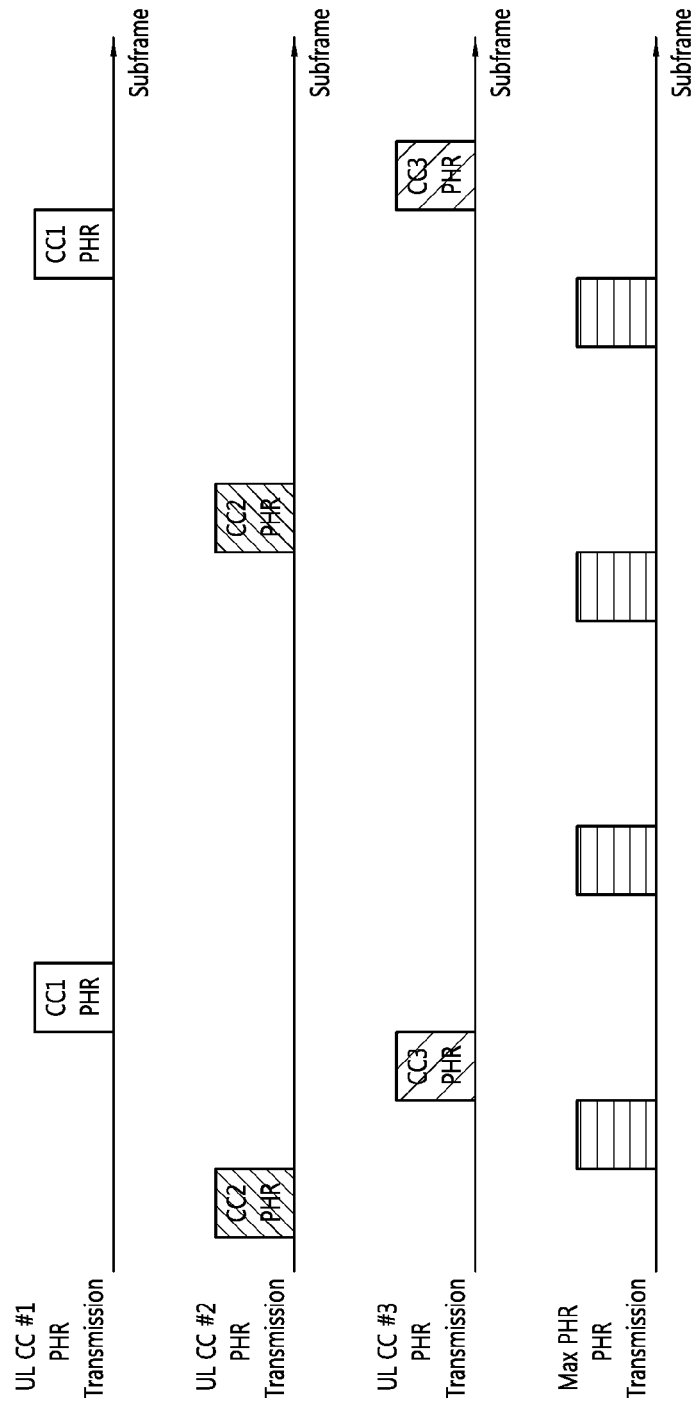
FIG. 14 shows a PHR method including additional PHR.

FIG. 14 shows a PHR method including additional PHR.

Referring to FIG. 14, a UL CC#1 to a UL CC#3 are allocated to a UE, and transmission of each PHI is configured in the UL CC#1 to the UL CC#3. In this case, a BS can add transmission configuration for PHI transmission with respect to a CC having a maximum PH together with PHI transmission configuration for each UL CC. That is, the BS can configure a PHI report for a UL CC having a maximum PH (or minimum PH) in addition to configuration for the PHI report for 3 UL CCs allocated to the UE. Therefore, the UE can perform PHR four times for 3 UL CCs.

Alternatively, the BS can configure such that PHI of a UL CC having a maximum PH in a subframe for performing the conventional PHR is transmitted by performing multiplexing. Two options are possible for the multiplexing.

1. PHI of a UL CC having a maximum (or minimum) PH can be transmitted together by performing multiplexing whenever PHI is transmitted in all UL CCs. 2. Alternatively, PHI of a UL CC having a maximum (or minimum) PH can be transmitted together by performing multiplexing only when PHI is transmitted in a specific UL CC. The specific UL CC may be a UL CC predetermined in a cell. The PHI may include a carrier indication field (CIF).

Figure 15:
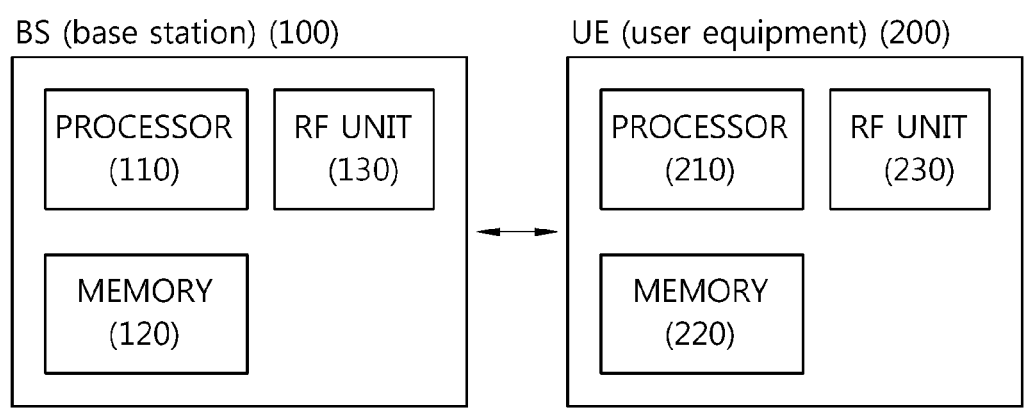
FIG. 15 is a block diagram showing a base station and a user equipment.

FIG. 15 is a block diagram showing a BS and a UE.

A BS 100 includes a processor 110, a memory 120, and a radio frequency (RF) unit 130. The processor 110 implements the proposed functions, procedures, and/or methods. For example, the processor 110 transmits a UL grant to a UE through a PDCCH, and transmits power determination information by using a higher layer signal such as an RRC signal. Further, the processor 110 recognizes a power condition of the UE on the basis of each serving cell's maximum transmission power value and PH information received from the UE, and then performs uplink scheduling according to the power condition. After performing the uplink scheduling, the processor 110 applies an MCS and the number of RBs changed when transmitting a UL grant to the UE.

The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives power determination information from the BS, and determines a maximum transmission power value for a CC (or serving cell) allocated to the UE by using the power determination information and a UE specific parameter. Further, the processor 210 estimates a PH for each CC on the basis of the maximum transmission power value and uplink transmission power of the UE, and calculates a PH corresponding to a difference to the maximum transmission power value. Furthermore, the processor 210 transmits the maximum transmission power and the PH to the BS.

The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation, and do not intend to limit technical scopes of the present invention. Therefore, the scope of the invention is defined not by the detailed description of the invention but by the appended claims, and all differences within the scope will be construed as being included in the present invention.

What is claimed is:

1. A method of transmitting a power headroom by a user equipment (UE) in a multi-carrier system, the method comprising:

receiving power determination information from a base station (BS);

determining a variable maximum transmission power value for each of a plurality of serving cells by using the power determination information and a UE specific parameter;

determining a power headroom (PH) for the each of the plurality of serving cells on the basis of the variable maximum transmission power value for each of a plurality of serving cells; and transmitting control information including first, second and third fields to the BS, wherein the first field indicates the variable maximum transmission power value for the each of the plurality of serving cells, the second field indicates the PH for each of the plurality of serving cells, and the third field indicates a specific cell for which the PH is provided among the plurality of serving cells, wherein the variable maximum transmission power value ($P_{cmax, c}$) for a serving cell c among the plurality of serving cells is determined by a below equation:

$$P_{cmax\_L} \leq P_{cmax, c} \leq P_{cmax\_H},$$

wherein the $P_{cmax-L}$ denotes a minimum value of $P_{cmax}$, and the $P_{cmax-H}$ denotes a maximum value of $P_{cmax}$, wherein the $P_{cmax\_H}$ is a minimum value between a value given by the power determination information and a maximum UE power ($P_{powerclass}$) depending on a power class of the UE, wherein the $P_{cmax\_}$ is a minimum value between $\Delta T_C$ subtracted from the value given by the power determination information and a difference value between the maximum UE power ($P_{powerclass}$) depending on power class of the UE and maximum power reduction (MPR), and the $\Delta T_C$ denotes a power amount applied when there is an uplink transmission by the UE at a band edge as a parameter determined depending on a band property, and wherein the $\Delta T_C$ is 1.5dB or 0dB.

2. The method of claim 1, wherein the power determination information includes information for reporting maximum output power allowed to the UE, and the PH for each of the plurality of serving cells is determined based on a maximum transmission power value for each of the plurality of serving cells.

3. The method of claim 1, wherein the UE specific parameter includes a maximum power reduction (MPR) allowed to the maximum output power of the UE, and the MPR is determined based on a modulation scheme of the UE and transmission band configuration.

4. The method of claim 1, wherein the plurality of maximum transmission power values and the plurality of PHs are transmitted through a media access control (MAC) layer signal.

5. The method of claim 1, wherein the power determination information is received by using a radio resource control (RRC) signal.

6. A user equipment (UE) comprising:
a radio frequency (RF) unit configured to transmit and receive a radio signal; and
a processor coupled to the RF unit and configured to:

receive power determination information from a base station (BS), determine a variable maximum transmission power value for each of a plurality of serving cells by using the power determination information and a UE specific parameter, determine a power headroom (PH) for the each of the plurality of serving cells on the basis of the variable maximum transmission power value for each of a plurality of serving cells, and transmit control information including first, second and third fields to the BS, wherein the first field indicates the variable maximum transmission power value for the each of the plurality of serving cells, the second field indicates the PH for each of the plurality of serving cells, and the third field indicates a specific cell for which the PH is provided among the plurality of serving cells, wherein the variable maximum transmission power value ($P_{cmax, c}$) for a serving cell c among the plurality of serving cells is determined by a below equation:

$$P_{cmax\_L} \leq P_{cmax, c} \leq P_{cmax\_H},$$

wherein the $P_{cmax-L}$ denotes a minimum value of $P_{cmax}$, and the $P_{cmax-H}$ denotes a maximum value of $P_{cmax}$, wherein the $P_{cmax\_H}$ is a minimum value between a value given by the power determination information and a maximum UE power ($P_{powerclass}$) depending on a power class of the UE, wherein the $P_{cmax\_L}$ is a minimum value between $\Delta T_C$ subtracted from the value given by the power determination information and a difference value between the maximum UE power ($P_{powerclass}$) depending on power class of the UE and maximum power reduction (MPR), and the $\Delta T_C$ denotes a power amount applied when there is an uplink transmission by the UE at a band edge as a parameter determined depending on a band property, and wherein the $\Delta T_C$ is 1.5dB or 0dB.

7. The UE of claim 6, wherein the power determination information includes information for reporting maximum output power allowed to the UE, and the PH for each of the plurality of serving cells is determined based on a maximum transmission power value for each of the plurality of serving cells.

8. The UE of claim 6, wherein the UE specific parameter includes a maximum power reduction (MPR) allowed to the maximum output power of the UE, and the MPR is determined based on a modulation scheme of the UE and transmission band configuration.

9. The UE of claim 6, wherein the maximum transmission power value and the PH for the each of the plurality of serving cells are transmitted through a media access control (MAC) layer signal.

10. The UE of claim 6, wherein the power determination information is received by using a radio resource control (RRC) signal.

* * * * *